UNITED STATES PATENT OFFICE.

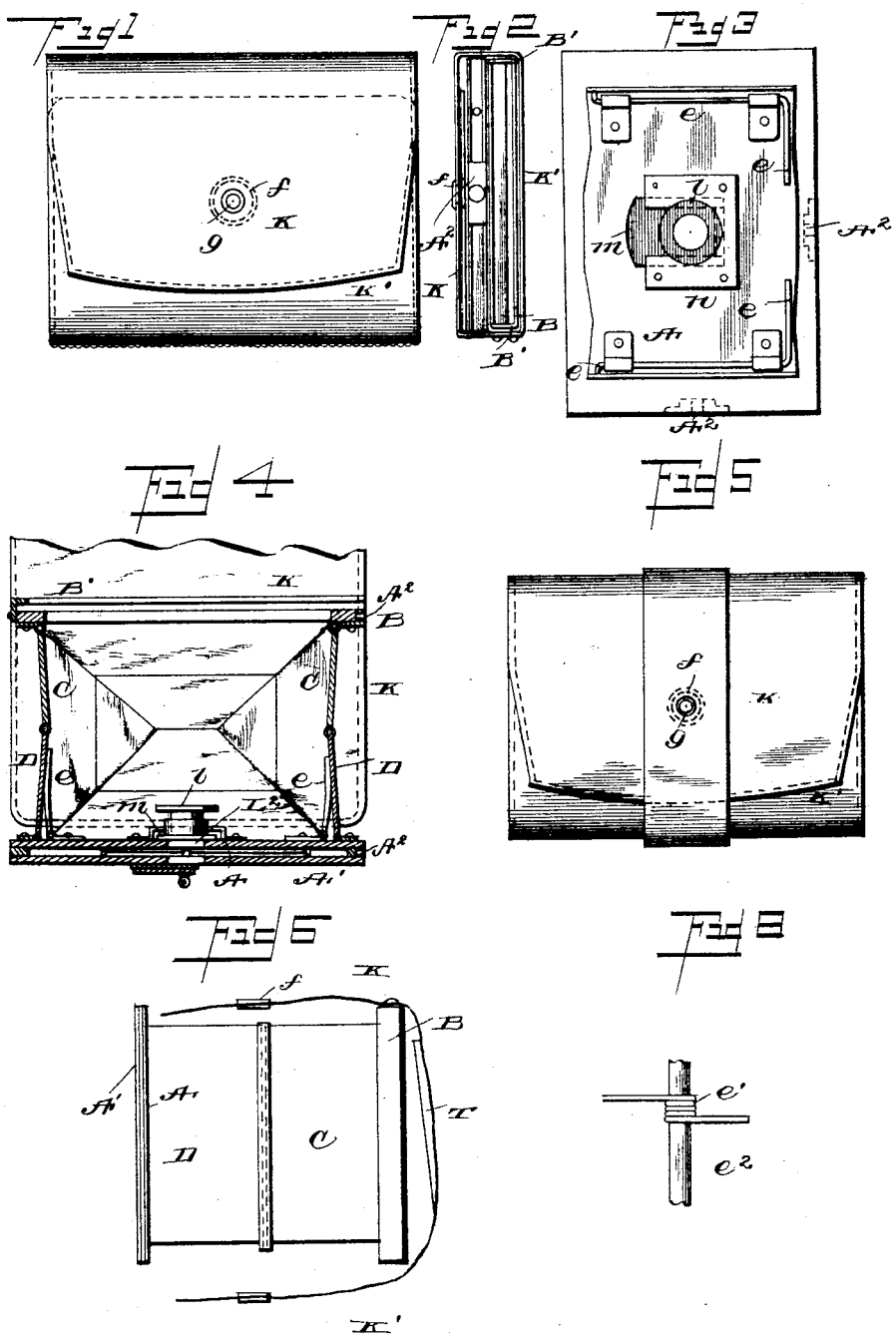

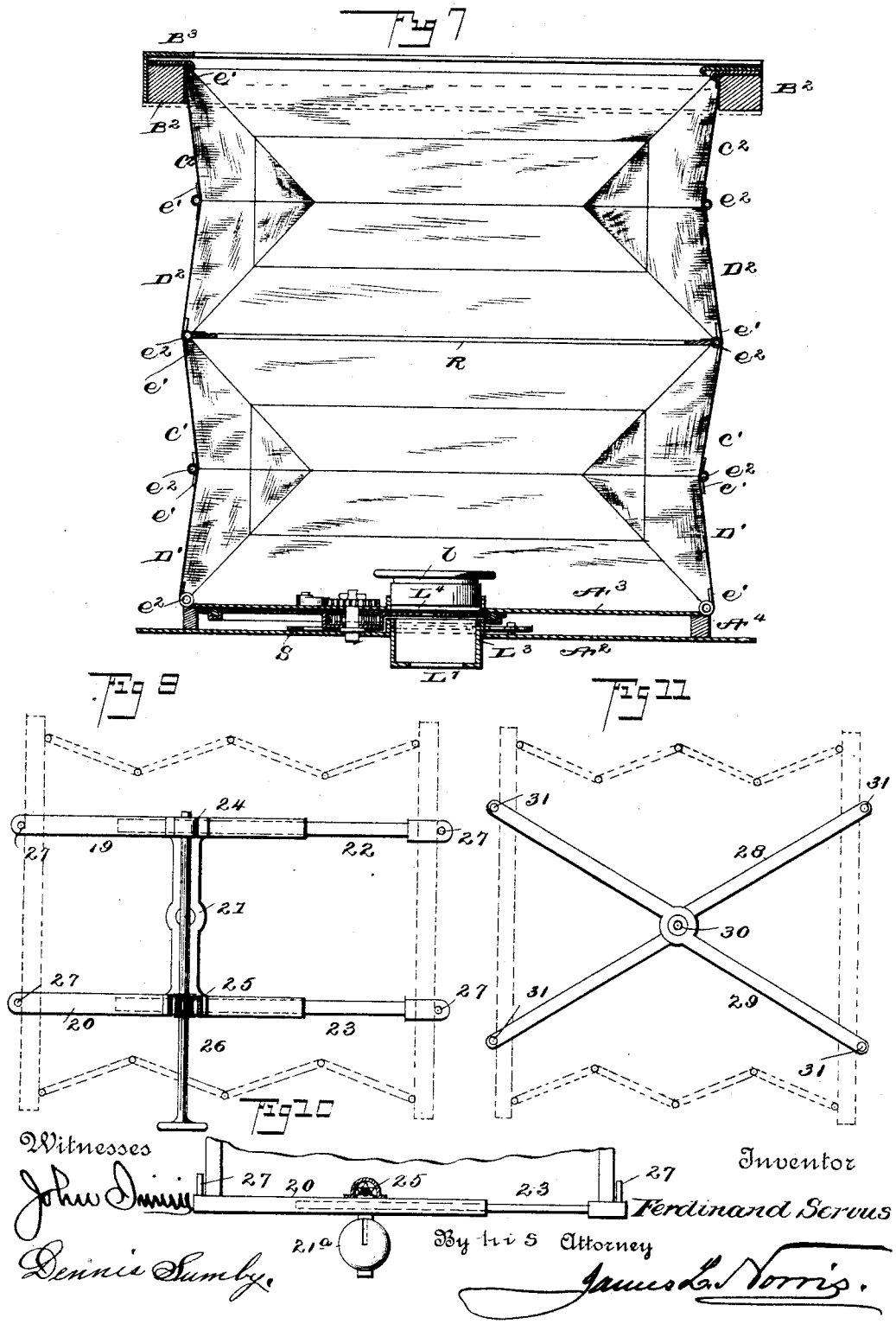

FERDINAND SERVUS, OF BERLIN, GERMANY.

PHOTOGRAPHIC CAMERA.

SPECIFICATION forming part of Letters Patent No. 473,358, dated April 19, 1892.

Application filed October 8, 1891. Serial No. 408,141. (No model.)

*To all whom it may concern:*

Be it known that I, FERDINAND SERVUS, a citizen of the German Empire, and a resident of Berlin, Germany, have invented a new and useful Improvement in Photographic Cameras, of which the following is a specification.

This invention has for its object to provide a novel photographic camera which can be extended for practicable use and collapsed into substantially the form of a book.

To accomplish this object my invention involves the features of construction and the combination or arrangement of devices hereinafter described and claimed, reference being made to the accompanying drawings, in which—

Figure 1 is a front elevation of a folding camera constructed in accordance with my invention. Fig. 2 is an end view of the same. Fig. 3 is a detail view looking at the inside of the front portion of the camera. Fig. 4 is a sectional plan view showing the camera extended for use. Fig. 5 is a front elevation showing the camera folded and held by an elastic band passing around the same. Fig. 6 is an elevation showing a leather cover provided with a pocket on its inner side. Fig. 7 is a sectional plan view of a modification, the camera being extended for use. Fig. 8 is a detail view of one of the spring-hinges for the modified camera exhibited in Fig. 7. Fig. 9 is a detail sectional plan view showing means for adjusting the camera to a greater or less depth. Fig. 10 is a detail side view of the same, and Fig. 11 is a detail plan view showing modified devices for adjusting the camera to a greater or less depth.

In order to enable those skilled in the art to make and use my invention, I will now describe the same in detail, referring to the camera exhibited by Figs. 1 to 4, inclusive, where the front forms a double wall consisting of the two plates A and A', of wood or metal, the former plate shown separately in Fig. 3. The rear wall is formed by the frame B, which is surrounded on three sides by the angle-plate B'. The frame B and the angle-plate B' form a guide, into which is slid a plate-holder that contains the sensitive plate. When adjusting the camera for a photograhic exposure, a milk-glass plate is first inserted in the place of the plate-holder. The upper, lower, and lateral walls, which connect with the front A A' and the frame B, are adapted to be folded up. For this purpose the upper and lower walls are made of an opaque material which can be folded, leather being preferred. In order to give the necessary fold to the camera, the lateral or side walls consist each of two solid flaps C and D, of leather or of wood, having a covering of leather or any desired material, which flaps are hinged together and are also fixed by means of a hinge to the plate A and the frame B. Fig. 4 shows the camera ready for use. Springs $e$ are provided, which tend to force the flaps C and D continually to the expanded position, Fig. 4, but do not prevent the folding of the partitions, so that the camera assumes the form shown in Figs. 1 and 2. In this case the whole is surrounded by a leather cover, and the two ends of the cover—namely, the flaps K and K'—are firmly connected by a clasp or locking device $f$, in order to keep the whole together. As soon as the clasp or locking device $f$ is opened the camera will unfold automatically under the action of the springs $e$. Then it is only necessary to fix it upon a stand in order to give it the exposure. The arrangement of the camera upon the stand can be effected in any suitable manner. Two small holes $A^2$ $A^2$ may be provided for this purpose in the front of the camera to secure it to the stand. As the camera is very light and the flaps C and D give it rigidity enough, this mode of fixing it upon the stand will be quite sufficient. The camera is either placed upon the broad or upon the narrow side, according as the exposure is to be lengthwise or crosswise. In the double wall A A' is arranged the shutter, which may be of any construction suitable for the conditions required.

On the wall A, inside of the camera, the objective $l$ is removably fixed behind the aperture $L^2$. It consists of two lenses held each in a short tube, the separation of these lenses from each other being effected by shifting the two tubes one within the other, as usual. To one of the two parts is soldered the small plate $m$, wherewith the objective is slid into the guide $n$. Before the camera is folded up the objective must be taken out in order to keep the camera ready for making the small instantaneous exposures by means of the second objective, as I will now explain.

For enabling the camera to be employed for very small instantaneous exposures a lens $g$ is provided in the clasp or locking device $f$, as shown in Fig. 1. This lens is placed exactly in front of the aperture $L^2$ when the apparatus has been folded up and closed. The sensitive plate, which, together with a plate-holder, is slid into the guide-frame B B′, is then immediately behind the aperture for the light. In order to give an exposure in this case, it is only necessary to take the apparatus from the pocket and hold it before the object to be photographed, the shutter being operated in a suitable manner. In case the camera is folded and use is made of the lens $g$, provided in the locking device or clasp $f$, Fig. 1, the instantaneous exposures will be very small, because the plate is only a short distance from the lens. Under these circumstances the plates employed are very small, and the plate-holders are specially adapted for them.

In the modified construction, Fig. 5, the lens $g$ for the small instantaneous exposures is arranged in an elastic band adapted to hold the camera in its folded condition. The elastic band will be provided with a suitable aperture or orifice adapted to receive the locking device or clasp $f$ and its lens $g$, so that the latter will be coincident with the opening $L^2$, Fig. 4, when the camera is folded.

In Fig. 6 I have exhibited a leather cover for the camera, which may be furnished with a pocket T for containing notes or other articles having reference to the exposures.

The improved camera, when folded, presents an external appearance similar to an ordinary pocket-book and is adapted to be held in the hand while making an exposure with little liability of being observed.

The modified folding pocket-camera shown in Fig. 7 is principally designed for taking comparatively large photographs—for example, cabinet size—while the camera hereinbefore described serves for taking small photographs, such as visiting-card size. The arrangement of the camera, Fig. 7, is more perfect, so that it will satisfy more extensive demands with respect to efficiency. Provision has been more especially made for a great adjustability, and the sensitive plate is adapted to be placed, together with the frame of the rear wall, farther from or nearer to the objective, according to the greater or smaller focal length of the lenses, so that various objectives can be employed. For adjusting in each case the depth of the camera use is made of special devices, which are shown separately and are hereinafter described. The two plates of the double front wall, which carries the objective and is provided with a shutter, are designated by the letters $A^2$ and $A^3$. The frame $A^4$ hermetically closes the intermediate space of the double wall to the outside and the front plate $A^2$ protrudes a little beyond it on the four sides. The frame $B^2$ at the rear of the camera, whose guide-plate $B^3$ receives the plate-holder with the sensitive plate, is larger than the frame $A^4$, and the folding walls are so arranged and fixed, on the one hand, to the frame $B^2$ and, on the other hand, to the front wall that the folded walls and also the frame $A^4$ can be pressed into the frame $B^2$. The part of the plate $A^2$ which protrudes beyond the frame $A^4$ then bears upon the frame $B^2$, as indicated by dotted lines in Fig. 7.

This camera has a greater depth than the one described with reference to Figs. 1 to 4. In order to enable the same to be used in a more or less extended state, four flaps C′ D′ $C^2$ $D^2$ are arranged on each side. These constitute the side walls and are connected by hinges with each other and with the front wall and the rear frame $B^2$ of the camera. For giving the requisite rigidity to the camera the stiffening-frame R is arranged between the pairs of flaps C′ C′ and $D^2$ $D^2$; but it should be observed that this stiffening-frame is not absolutely necessary. Moreover, the number of the flaps can be increased. The manner in which the upper and lower cloth walls will fold together in the folding up of the side walls is indicated by the shading. The edges shaded darkest retreat or collapse into the interior of the camera, while the others pass outward. In like manner the cloth folds up, as in the arrangement shown in Figs. 1 and 2. The folded camera, like that represented in Figs. 1 and 2, is also in this case placed in a leather cover, and if the latter is opened the camera will be automatically extended. To accomplish this, the helical springs $e'$ are slid upon the hinge-rods $e^2$ between the hinges. Such a spring is shown in Fig. 8, and its ends press upon the flaps and have the tendency to open them. In the folding of the flaps the helices are wound together still further, so that on releasing the camera the latter will be automatically extended. Any number of such springs can be arranged upon each hinge-rod $e^2$. Of course the joints of the hinges and the adjoining edges of the intermediate walls must be carefully pasted over with opaque material; but the free action of the hinges must not be obstructed thereby.

The apertures $L^3$ and $L^4$ in the two plates $A^2$ and $A^3$ are formed by stamping, so as to produce short tubular projections for the reception of the objective $l$ and the screen $L^7$, which are simply slid into the tubular projections. This arrangement of the tubular projections of sheet metal has proved very practical. According to the kind of exposures to be given greater or smaller screens and simple-lens or double-lens objectives are inserted. In lieu of a screen a lens may be employed.

For the purpose of enabling the camera to be adjusted to a greater or smaller depth use can be made of devices of the kind represented in Figs. 9, 10, and 11. In the arrangement shown in Figs. 9 and 10 the two rackguides 19 20 are connected by the cross-piece 21, through the medium of which the device may be held upon a journal or upon a ball 21ª in order to enable it to be placed upon a stand. In the said guides the two racks 22 23 are adapted to slide. By turning the shaft 26 the toothed wheels 24 and 25, arranged upon it, will move the racks more or less into or from the guides, thereby causing the pins 27 between which the camera is put to approach or recede from each other. The springs which tend to extend the camera will press the latter firmly between the pins 27.

A simpler construction is the device, Fig. 11, wherein the pins 31, between which the camera is placed, are provided upon the ends of the levers 28 and 29, connected, as at 30, after the manner of tongs. According as the levers, which are fitted tightly together, are caused to diverge more or less the pins 31 can be moved toward or away from each other. Of course any other desired adjusting devices can be employed. For instance, instead of simple tongs a kind of lazy-tongs or the like may be used.

Similarly to the apparatus represented in Figs. 1 to 4 the apparatus above described with reference to Figs. 9, 10, and 11 is placed in a leather cover, the clasp or locking device of the latter being also provided with a lens, which is placed closely and centrally above the apertures and serves only for very small exposures.

Having thus described my invention, what I claim is—

1. A folding photographic camera consisting of front and rear walls, flexible side walls consisting of flaps hinged to each other and to the front and rear walls, a spring bearing against said hinged flaps, which constantly tends to extend the flexible side walls, and a leather case or cover, which holds the parts in their folded position, substantially as described.

2. A photographic camera consisting of a rear frame having means to receive and retain a plate-holder, a front frame comprising parallel walls having coincident orifices and an objective, a shutter mechanism arranged between the parallel walls of the front frame, the collapsible side walls hinged to each other and to said front and rear frames, a covering or casing comprising flaps having locking devices to retain the side walls in their collapsed condition, and a spring for automatically extending the side walls when the locking device is released, substantially as described.

3. A camera consisting of front and rear frames provided, respectively, with shutter mechanism and means for retaining a plate-holder, hinged collapsible side walls connecting the front and rear frames, a covering or casing comprising flaps having a clasp or locking device containing a lens for small instantaneous exposures, and a spring for automatically extending the side walls when the clasp or locking device is released, substantially as described.

4. A photographic camera consisting of a rear frame having means to receive and retain a plate-holder, a front frame comprising parallel walls having coincident orifices and an objective, a shutter arranged between the parallel walls, the hinged collapsible side walls connecting the front and rear frames, a covering or casing comprising flaps having a clasp or locking device which contains a lens for small instantaneous exposures, and means for automatically extending the side walls when the clasp or locking device is released, substantially as described.

5. An extensible and collapsible photographic camera having a front frame provided with an objective and a shutter mechanism, in combination with flaps for retaining the camera in its collapsed condition, one of the flaps having a clasp or locking device provided with a lens for small instantaneous exposures while the camera is collapsed or folded, substantially as described.

6. The combination, in a photographic camera, of front and rear frames provided, respectively, with shutter mechanism and means for retaining a plate-holder, the collapsible side walls connecting the front and rear frames, mechanism, substantially as described, for adjusting and holding the front and rear frames at different distances apart, and an inclosing case having a lens for small exposures, substantially as described.

In testimony that I claim the foregoing as my invention I have signed my name, in presence of two witnesses, this 18th day of February, 1891.

FERDINAND SERVUS.

Witnesses:
I. LEMAN,
A. SIEBER.